United States Patent [19]

Wachter et al.

[11] 4,177,386
[45] Dec. 4, 1979

[54] METHOD AND APPARATUS FOR STORING NUCLEAR FUEL ASSEMBLIES IN MAXIMUM DENSITY RACKS

[76] Inventors: William J. Wachter, R.D. 4, English Rd., Wexford, Pa. 15090; Thomas R. Robbins, 1528 Crofton Pkwy., Crofton, Md. 21114

[21] Appl. No.: 910,156

[22] Filed: May 26, 1978

[51] Int. Cl.² .............................................. G21F 5/00
[52] U.S. Cl. .................................. 250/507; 176/30; 250/518
[58] Field of Search .................... 250/507, 518; 176/30

[56] References Cited

U.S. PATENT DOCUMENTS

| 3,859,533 | 1/1975 | Suvanto | 250/507 |
| 4,034,227 | 7/1977 | Soot | 250/507 |
| 4,042,828 | 8/1977 | Rubinstein et al. | 176/30 |
| 4,063,999 | 12/1977 | Wade | 250/507 |
| 4,088,897 | 5/1978 | Soot | 250/507 |

Primary Examiner—Harold A. Dixon
Attorney, Agent, or Firm—Thomas H. Murray

[57] ABSTRACT

A maximum density storage rack is provided for long term or semipermanent storage of spent nuclear fuel assemblies. The rack consists of storage cells arranged in a regular array, such as a checkerboard array, and intended to be immersed in water. Initially, cap members are placed on alternate cells in such a manner that at least 50% of the cells are left open, some of the caps being removable. Spent fuel assemblies are then placed in the open cells until all of them are filled. The level of reactivity of each of the stored fuel assemblies is then determined by accurate calculation or by measurement, and the removable caps are removed and rearranged so that other cells are opened, permitting the storage of additional fuel assemblies in a pattern based on the actual reactivity such that criticality is prevented.

7 Claims, 10 Drawing Figures

METHOD AND APPARATUS FOR STORING NUCLEAR FUEL ASSEMBLIES IN MAXIMUM DENSITY RACKS

BACKGROUND OF THE INVENTION

The present invention relates to long term or semipermanent storage of spent nuclear fuel assemblies, and more particularly to a storage rack for spent fuel assemblies and a method of storage of such fuel assemblies to maximize the capacity of the rack while preventing criticality.

Nuclear reactors consist of an array of fuel rods containing the nuclear fuel. The fuel rods are metal tubes, typically from 8 to 15 feet in length and about ½ inch in diameter, and are supported in groups in fuel assemblies which may comprise a considerable number of rods. The large reactors utilized for power generation contain a large number of these fuel assemblies arranged in a suitable configuration.

After an extended period of operation, the irradiated or spent fuel assemblies must be removed from the reactor and replaced. The spent fuel rods contain residual amounts of the original fuel material, and varying amounts of numerous fission products resulting from fission of the nuclei of the original fuel and other nuclear reactions, as well as from radioactive decay of initially-formed fission products. Certain of these materials are themselves fissionable. Many of the fission products are highly radioactive, at least initially, and thus produce considerable heat, while the entire fuel assembly is dangerously radioactive. The fuel rods can be reprocessed by chemically separating the fissionable material for reuse as fuel and recovering various other fission products, such as certain rare earth elements, for example, which have substantial commercial value.

Suitable facilities must be provided for the storage of these highly radioactive fuel assemblies after removal from the reactor until they can be reprocessed or otherwise disposed of. Such storage presents serious problems since the fuel assemblies are initially highly radioactive and generate a great deal of heat. They must, therefore, be kept submerged in water which serves as a coolant to prevent overheating as well as a radiation shield and moderator for the fast neutrons which are still being emitted. It is also necessary to be sure that the assemblies are stored in a manner that will prevent criticality of the collection of fuel assemblies while keeping the space required to a minimum. After some period of time, the heat generated and the radioactivity of the fuel assemblies decline, since many of the fission products have relatively short halflives, and the nature of the storage problem changes as both the heat to be dissipated and the radiation hazard decrease.

In our prior U.S. Pat. No. 4,010,375, there is disclosed a storage rack for spent nuclear fuel assemblies which is primarily intended for temporary storage of fuel assemblies in a water-filled pit. The rack consists of a checkerboard array of storage cells with the spent fuel assemblies placed in alternate cells. The intervening cells are filled with water which functions as a moderator and as a coolant, and also include a poison or neutron-absorbing material. This arrangement prevents criticality of the collection of fuel assemblies while maximizing the capacity of the rack for relatively short term storage. We have also proposed, in our copending application Ser. No. 851,038, filed Nov. 14, 1977, to use a similar rack structure for very long term or permanent storage, and to maximize the capacity by completely filling all the cells in the array after sufficient irradiation of the fuel and subsequent radioactive decay has occurred to make this safely possible. Concrete shielding may be provided for permanent storage. There is also a need, however, for relatively long term or semipermanent storage of spent nuclear fuel assemblies in a manner which will permit the storage of a maximum number of such assemblies in a given space, with complete safety, for a relatively long period until they can be disposed of by reprocessing, placing them in permanent storage, or otherwise.

In the conventional design of spent fuel storage facilities, criticality is prevented by means of the spacing, or pitch, between adjacent fuel assemblies in the storage rack. There is a possibility that it may at some time be necessary to completely unload the reactor to make repairs or inspections inside the reactor pressure vessel, and it is, therefore, assumed that it may be necessary to place nearly fresh or unirradiated fuel assemblies in the storage rack during such repairs or inspection. In conventional designs, therefore, the pitch between adjacent fuel storage locations has been determined on the basis of the reactivity of fresh or unirradiated fuel assemblies. This, of course, requires a much larger pitch than is needed to prevent criticality with spent fuel assemblies after discharge from the reactor, and results in reduced storage capacity of a given space. Furthermore, once the pitch has been determined in a conventional design, it cannot be changed without rebuilding the storage rack. The arrangement and dimensions of such a rack are such that additional spent fuel assemblies cannot be placed between the initial storage positions both because the usual designs do not provide for accommodating such additional fuel assemblies and because the dimensions are generally too small.

SUMMARY OF THE INVENTION

In accordance with the present invention, a maximum density rack structure and method of storage are provided for long term or semipermanent storage of spent nuclear fuel assemblies which provides maximum capacity and complete safety. The problems discussed above of conventional storage rack designs are overcome by providing the ability to change the pitch between adjacent fuel assemblies when the actual reactivity level of the spent fuel assemblies is known. Packing or storage densities as high as 90% can thus be attained.

These results are obtained by means of a storage rack consisting of a plurality of identical storage cells disposed in a regular array. The cells are of proper size to contain one or more of the fuel assemblies to be stored and are preferably made of stainless steel, which is capable of absorbing neutrons. The rack is intended to be immersed in water which serves as both a coolant and a moderator for the fuel assemblies to be stored in the rack. Cap members are placed on alternate cells in each row with the caps in adjoining rows staggered with respect to each other, the intervening cells being left open, and certain of the caps being removable. The cap members determine which cells are available for storage by covering the others, and also serve as lead-in guides to guide the fuel assemblies into the open cells. Initially, the rack is filled by placing fuel assemblies in the cells that are left open, so that about 50% of the available storage area is filled in this way. This may take a substantial period of time, such as several years for a rack at a large power generating site. The rack may then be surveyed and the reactivity level of the fuel assemblies stored in the rack assessed. This survey may be based on the known operating history of the fuel assemblies or on actual measurements. On the basis of such a survey, or on the basis of the known and calculated characteristics of the fuel, rate of burn-up, time of exposure in the reactor and other known factors, a final storage configuration is determined which will prevent criticality. The removable caps are removed from the cells which they previously covered and rearranged to open additional storage cells in the pattern thus determined. These additional storage cells are then filled with fuel assemblies, the remaining cells still being filled with water. The final result is a rack which contains fuel assemblies in a carefully determined pattern such that unfilled cells containing water are distributed in the proper positions to act as moderators and neutron-absorbing elements to prevent criticality. In this way, the final storage pattern, or pitch between fuel assemblies, is determined by the reduced reactivity of the spent fuel assemblies as they are actually discharged from the reactor. The capacity or packing density of the rack is thus maximized, and in some cases as much as 90% of the available storage area can be filled with complete safety.

BRIEF DESCRIPTION OF THE DRAWINGS

The invention will be more fully understood from the following detailed description, taken in connection with the accompanying drawings, in which.

DESCRIPTION OF THE PREFERRED EMBODIMENT

Figure 1:
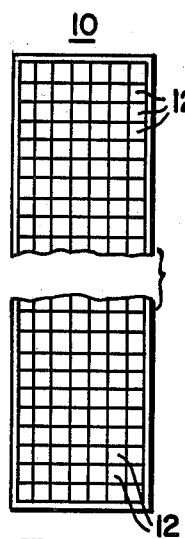
FIG. 1 is a plan view of a rack embodying the invention.
Figure 2:
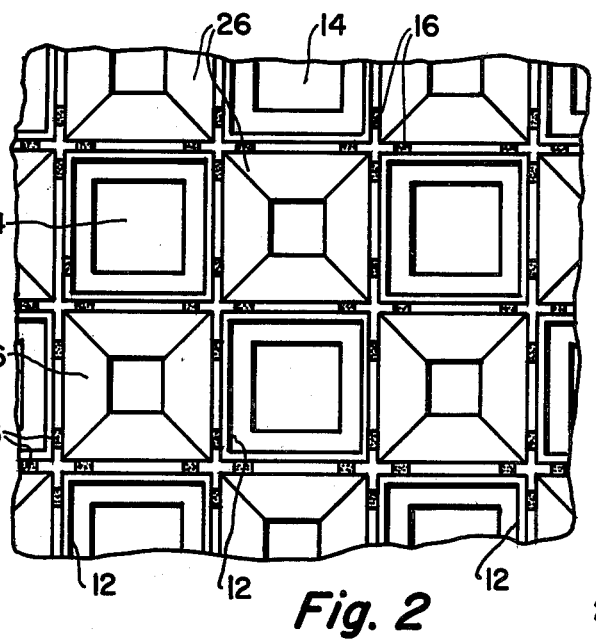
FIG. 2 is a plan view of a portion of the rack of FIG. 1 on an enlarged scale.
Figure 3:
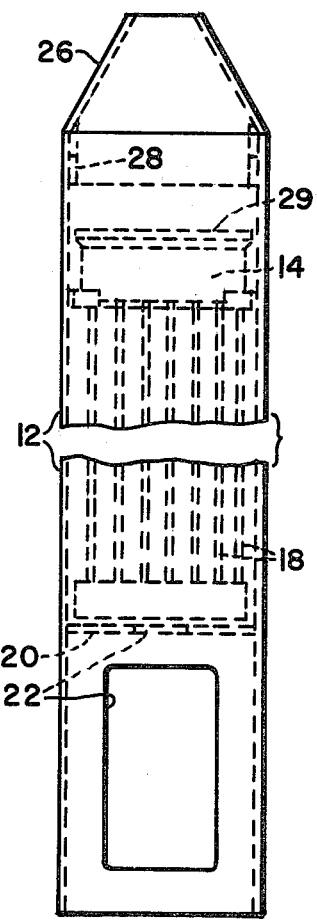
FIG. 3 is a side elevational view of one storage cell with a cap in place.

FIGS. 1-3 of the drawings show an illustrative embodiment of the invention in a storage rack for spent nuclear fuel assemblies. A rack 10 is shown generally in FIG. 1 as comprising a plurality of identical storage cells 12 which are aligned with each other to form a checkerboard array. The rack is shown alone in FIG. 1 but it will be understood that it is intended to be immersed in a water-filled pit, as described in the above-mentioned patent, or otherwise immersed in water. The rack is of modular construction consisting of the necessary number of identical cells 12 which are preferably square in cross section and of sufficient length, as shown in FIG. 3, to contain one or more fuel assemblies 14 for storage. The cells are aligned with each other as shown and may be joined together by welding, as indicated at 16, or in any desired manner. The cells 12 may be rectangular if desired and may be disposed in a regular array in any suitable configuration. The cells 12 are preferably made of stainless steel which is a satisfactory structural material and which is also capable of serving as a neutron-absorbing or poison material. Other structural materials and poison materials could, of course, be used if desired, and a solid moderator, as disclosed in the above-mentioned application, could be used instead of water.

The cells 12 are all identical and as shown in FIGS. 2 and 3, are square and of suitable size, both in cross section and in vertical height, to contain one or more fuel assemblies 14 each having a number of fuel rods 18. The size of the cells 12 and the number of assemblies to be placed in each cell depend, of course, on the size and characteristics of the particular fuel assemblies to be stored. The cells 12 are open at the top and bottom, and a partition 20 is placed in each cell near the bottom to support the fuel assembly 14 placed in the cell. Windows 22 are provided in the partition 20 and cell walls, so that water can circulate freely through the cell to remove heat generated in the fuel assembly. It will be understood that any type of base or support for the cell may be used that will allow water to circulate freely.

The physical construction and arrangement of the rack 10 are thus generally similar to the racks disclosed in the patent and patent application referred to above. In accordance with the present invention, however, cap members or funnels 26 are placed on certain of the storage cells 12. Each cap member 26, as shown in FIG. 3, is open at the top to permit circulation of water and has sloping sides. The cap is of square configuration to fit on the cell 12 and preferably has longitudinal extensions 28 fitting snugly inside the cell to hold the cap in place. On most cells, the cap 26 is thus held in place by frictional engagement, so as to be removable, but certain of the caps may be welded or otherwise permanently secured in place, as discussed hereinafter. The caps 26, of course, prevent entrance of fuel assemblies 14 into the cells 12 on which they are placed, so that these cells remain filled with water 29, and the position of the caps in the rack 10 defines the pattern in which fuel assemblies are placed in the rack. It will also be noted that the sloping sides of the caps function as lead-in guides or funnels to guide the fuel assemblies into the adjacent open cells, thus facilitating loading of the fuel assemblies into the rack in the desired manner.

Figure 4:
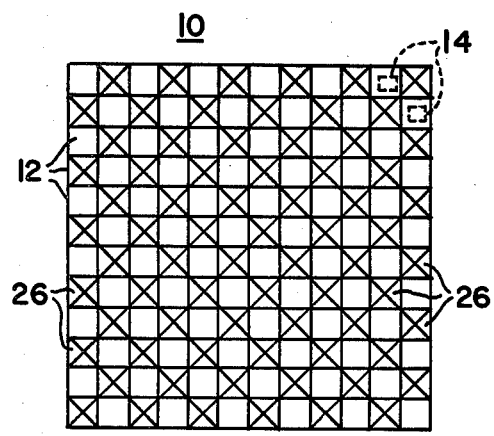
FIGS. 4-9 are schematic diagrams showing various patterns for storage of fuel assemblies in the rack.

Initially, as shown in FIG. 2 and in the diagram of FIG. 4, the caps 26 are placed on alternate cells 12 in each row of cells, the caps in adjacent rows being staggered with respect to each other. Every other cell 12 in each row is thus initially covered by a cap while the adjacent cells on each side are open and available for storage of fuel assemblies. The rack 10, or a predetermined portion of the rack, such as is shown in the diagram of FIG. 4, can now be initially filled. This is done by placing spent fuel assemblies 14 in the open cells 12, as shown in FIGS. 2 and 4. The fuel assemblies 14 may be loaded into the open cells 12 in any order and over any period of time, depending on the size of the rack, the number of fuel assemblies to be stored at a given time, and other factors. When the initial loading is thus completed in the pattern shown in FIG. 4, alternate cells 12 contain fuel assemblies 14 while the intervening cells are still filled with water which serves as a moderator. The water-filled cells are thus neutron traps since the stainless steel walls have the ability to absorb neutrons. Other poison materials could, of course, be used in or on the cell walls in addition to, or instead of, the stainless steel. The rack is thus loaded with a packing density of 50% of the nominal maximum capacity which would be reached if all the cells were filled, while the arrangement prevents criticality even at an initial high level of radioactivity characteristic of fresh or unirradiated fuel assemblies.

When the initial loading of the rack is completed, a considerable time will have elapsed since the first fuel assemblies were loaded into the rack, and the irradiation history of each fuel assembly in the rack will be accurately known. At the end of this time, an examination or survey of the level and distribution of the actual reactivity then existing in the storage rack is made. This study shows the actual conditions in the waterfilled rack and is analyzed to determine what pattern or arrangement of fuel assemblies can be utilized for storage of additional assemblies in some of the previously unused cells to increase the packing density. A storage pattern for loading additional fuel assemblies in the rack in a manner which will prevent criticality is selected on the basis of this study. The removable cap members 26 are then removed from the cells on which they were initially placed and redistributed to define the new pattern of stored fuel assemblies.

In many cases, the type of fuel, rate of burn-up, and other factors, are known reasonably well in advance for a particular reactor, and the reactivity of the fuel assemblies can be calculated so that the probable final pattern of storage in the rack can be predetermined. The caps which define this final pattern can then be welded in place initially and the necessary removable caps put in position to define the initial loading pattern.

In such cases, it may be desirable to provide a temporary storage rack which may be a section of the main rack itself or a separate rack structure of appropriate size placed closely adjacent the main rack. During refueling of the reactor, the spent fuel assemblies removed from the reactor are initially placed in the temporary storage rack. After completion of a refueling, the spent fuel assemblies are checked for reactivity level and moved into the main rack in the initial storage pattern as described above. This procedure is repeated at each refueling until the main rack is filled in the initial pattern, which will typically be a period of at least several years from the first refueling. The removable caps are then removed and rearranged, if necessary, to open the additional storage cells for the final loading pattern. Any necessary checking and surveying of the fuel assemblies may be carried out before proceeding. As a further check, the minimum necessary time of exposure in the reactor for different initial enrichments of the fuel can be determined, for the final packing density, to insure that fuel assemblies to be transferred to the main rack can be safely stored in the final pattern. Additional refuelings of the reactor can then be performed, and the spent fuel transferred from the temporary rack to the main rack as before until the final storage pattern is completed.

The temporary storage rack may be a section of the main rack permanently maintained at the initial storage pattern or may be a separate rack structure arranged to have the same storage pattern as the initial pattern in the main rack or designed to have a larger fixed pitch between fuel assembly storage positions. The use of such a relatively small temporary storage rack makes it possible to provide the capability of safely temporarily storing fresh, or nearly fresh, or unirradiated assemblies at the larger effective pitch necessary because of the higher reactivity level of such fuel assemblies.

The diagrams of FIGS. 4–9 show various possible patterns of rack loading with increasing packing densities. In each of these diagrams, the cap members 26 are indicated diagrammatically in the final configuration, while the intervening blank cells represent cells which are open and available for storage of fuel assemblies. In each case, after the initial loading pattern of FIG. 4 has been completed, some or all of the removable caps 26 are removed and placed on the cells already containing fuel assemblies and on those cells which are to remain water-filled, leaving open the cells available for additional storage. Additional spent fuel assemblies are then placed in these open cells until all of the open cells are filled. The caps on the previously filled cells may then be removed, leaving caps only on the water-filled cells. This final configuration is shown in each case in the diagrams of FIGS. 4–9, in each of which caps 26 are shown on the water cells and the open cells all contain fuel assemblies.

Figure 5:
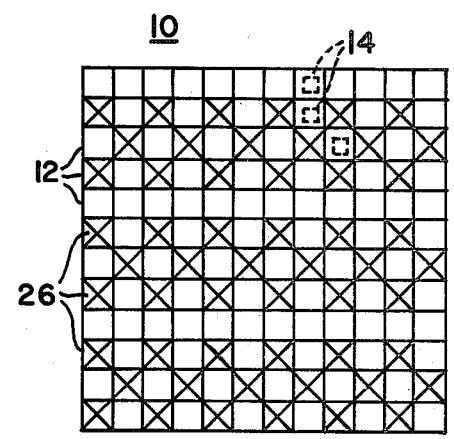
Figure 6:
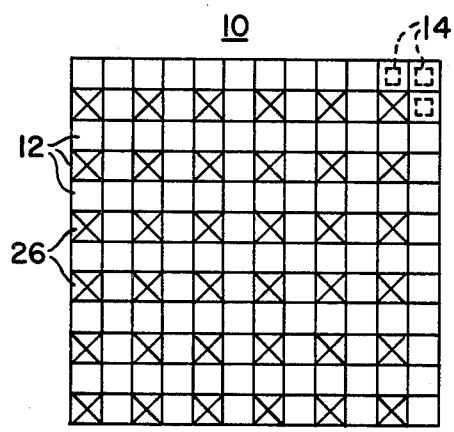
Figure 7:
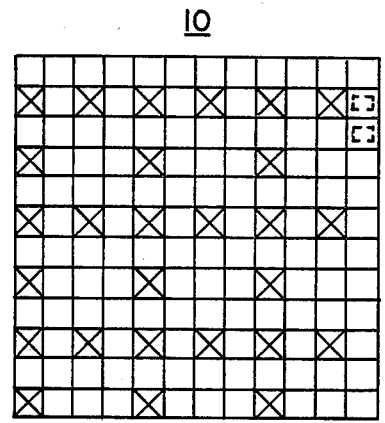
Figure 8:
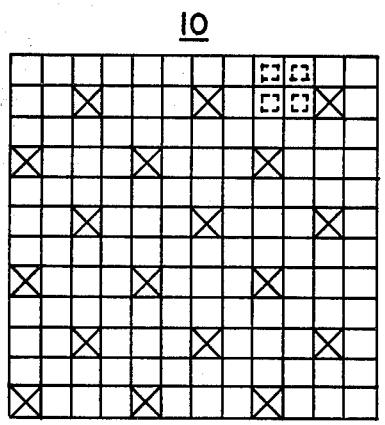
Figure 9:
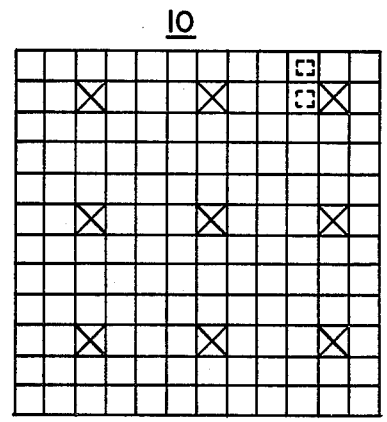

FIG. 4 shows the initial loading pattern discussed above, with alternating cells in each row containing fuel assemblies while the intervening cells are filled with water. FIG. 5 shows an arrangement in which all of the cells in every fourth row contain fuel assemblies, in addition to the alternate cells in the other rows which were previously filled. This results in a packing density of 63%. FIG. 6 shows a storage pattern in which 75% of the cells are available for fuel assemblies, while FIGS. 7, 8 and 9 show further configurations resulting in 81% packing density, 88% packing density, and 94% packing density, respectively. In each case, the final loading pattern consists of regularly arranged storage cells containing fuel assemblies with water-filled cells placed throughout the array in positions such that criticality is prevented with the particular level of reactivity present. The maximum packing density reasonably obtainable is represented by FIG. 9 in which the remaining cap members 26 are spaced apart from each other by three intervening cells in both directions. Since this is the maximum packing density, the caps 26 in the positions of FIG. 9 are preferably welded in place and thus define the final pattern if the reactivity level is low enough. If the final loading pattern can be predetermined, as discussed above, the caps which define that pattern can be initially welded in place.

In each case, as described above, the final pattern when storage is completed consists of an array of spent fuel assemblies with water cells containing columns of water disposed in a regular pattern throughout the array. The arrangement is thus analogous to that of a power reactor, and the positions of the water cells may be determined in the same manner as the location of control rods in a reactor. Since the design principles and techniques for defining a suitable pattern of control rods to meet reactor shutdown requirements are well known, determination of the storage patterns and the location of water cells in the present storage rack can readily be made in the same manner. This technology is well established, and the choice of the final loading pattern among the possibilities illustrated, or other equivalent patterns, can readily be made when the level and distribution of reactivity after completion of the initial loading is known. This can be calculated or accurately measured by a survey of the rack. Criticality of the collection of fuel assemblies in the rack is thus reliably prevented. In effect, therefore, the spent fuel assemblies are initially stored with a conservative, relatively large pitch between assemblies, and after the initial loading, the effective pitch is changed and reduced to that required for safety with the level of reactivity actually existing. This rack structure and method of loading, therefore, make it possible to maximize the capacity of a given storage area for spent nuclear fuel assemblies for safe and efficient long term storage, so that such assemblies can safely be stored for whatever time is necessary until they can be removed for permanent disposition.

Figure 10:
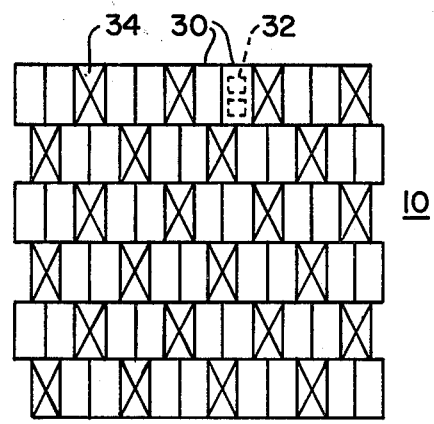
FIG. 10 is a similar diagram showing a somewhat modified embodiment of the rack structure.

Various modifications and other arrangements of the rack are, of course, possible. For example, in the case of a storage rack to be used with a boiling water type of reactor, the arrangement shown in FIG. 10 might be utilized. The fuel assemblies used in these reactors are relatively small in cross section, such as 5 inches by 5 inches, for example, and the storage cells 30 of FIG. 10 are thus rectangular so that each cell can accommodate two of these smaller fuel assemblies 32. The cells 30 are otherwise similar to those described above and are arranged in a regular array as shown with rectangular caps 34 similar to the caps 26 placed on certain cells in the configuration shown for the initial loading of the rack. This arrangement permits somewhat greater initial packing density, and after the initial loading is completed, the level of reactivity is surveyed and a final loading pattern determined in the manner described above. Other suitable configurations of storage cells disposed in a regular array could, of course, be utilized in a similar manner.

We claim as our invention:

1. A storage rack for spent nuclear fuel assemblies for immersion in water, said rack comprising a plurality of identical storage cells disposed adjacent each other in a regular array with adjacent cells connected together, cap members disposed on alternate cells and adapted to guide fuel assemblies into adjacent cells whereby the rack initially contains fuel assemblies in at least half of the storage cells, the remaining cells being filled with water, and at least some of said cap members being removable to permit fuel assemblies to be placed in additional cells in a final pattern determined by the actual level of reactivity of said fuel assemblies such that criticality is prevented.

2. A storage rack as defined in claim 1 in which said storage cells include a neutron-absorbing material.

3. A storage rack as defined in claim 1 in which said storage cells are made of stainless steel.

4. A storage rack as defined in claim 1 in which certain of said cap members are permanently attached to the cells, said permanently attached cap members being in positions in the array of cells which determine said final pattern.

5. A storage rack as defined in claim 1 in which the storage cells are of square cross section and aligned with each other to form a checkerboard array.

6. A storage rack as defined in claim 5 in which cap members are initially disposed on alternate storage cells in each row of cells, the cap members in adjacent rows being staggered with respect to each other.

7. A storage rack as defined in claim 6 in which certain of said cap members are permanently attached to the cells, said permanently attached cap members being on cells which define said final pattern.